(12) United States Patent
Ito et al.

(10) Patent No.: US 7,898,726 B2
(45) Date of Patent: Mar. 1, 2011

(54) ELECTROPHORETIC DISPLAY

(75) Inventors: Wataru Ito, Chino (JP); Junpei Yoshida, Chino (JP); Masahiro Yamada, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 12/389,613

(22) Filed: Feb. 20, 2009

(65) Prior Publication Data

US 2009/0237774 A1 Sep. 24, 2009

(30) Foreign Application Priority Data

Mar. 21, 2008 (JP) .............................. 2008-073582
Oct. 22, 2008 (JP) .............................. 2008-271839

(51) Int. Cl.
*G02B 26/00* (2006.01)
(52) U.S. Cl. ...................................... 359/296; 359/290
(58) Field of Classification Search ......... 359/290–292, 359/295, 296, 298
See application file for complete search history.

(56) References Cited

U.S. PATENT DOCUMENTS 6,029,783 A * 2/2000 Wirthlin .................. 188/267.1
7,339,716 B2 * 3/2008 Ding et al. ................. 359/296
2007/0182891 A1 * 8/2007 Toyoda ....................... 349/111

FOREIGN PATENT DOCUMENTS

| JP | 2002-251143 | 9/2002 |
| JP | 2005-205738 | 8/2005 |
| JP | 2006-150755 | 6/2006 |

* cited by examiner

*Primary Examiner*—Ricky L Mack
*Assistant Examiner*—Brandi N Thomas
(74) *Attorney, Agent, or Firm*—AdvantEdge Law Group, LLC

(57) ABSTRACT

An electrophoretic display includes an electrophoretic display module including an element substrate, a counter substrate disposed on a display side of the element substrate, and an electrophoretic layer held therebetween; a first protective sheet disposed on a counter substrate side of the electrophoretic display module; a second protective sheet disposed on an element substrate side of the electrophoretic display module so as to face the first protective sheet with the electrophoretic display module disposed therebetween; and a frame member disposed between the first and second protective sheets along the periphery thereof so as to surround the electrophoretic display module. The frame member is integrated with the first and second protective sheets by welding the frame member to the first protective sheet and to the second protective sheet.

18 Claims, 9 Drawing Sheets

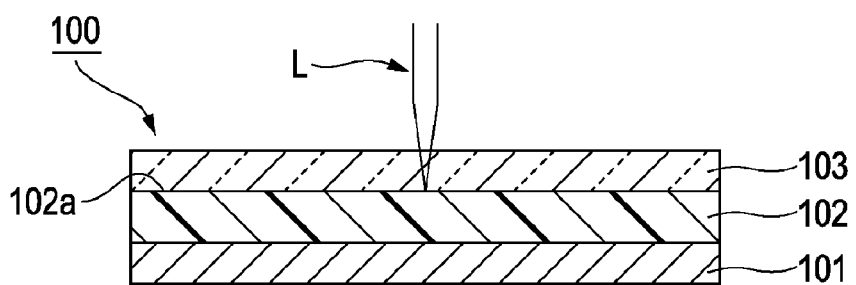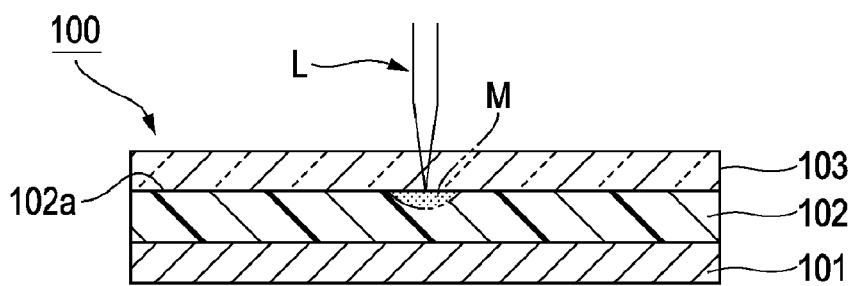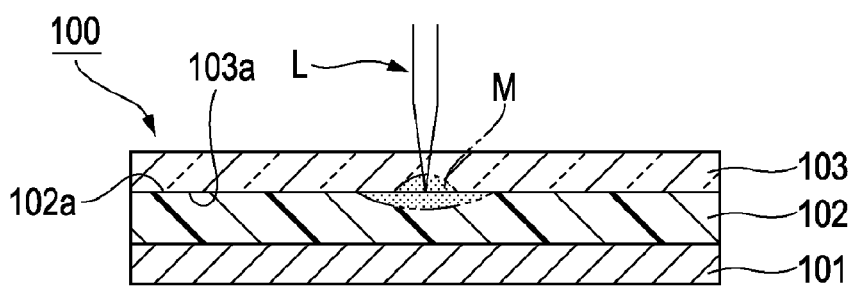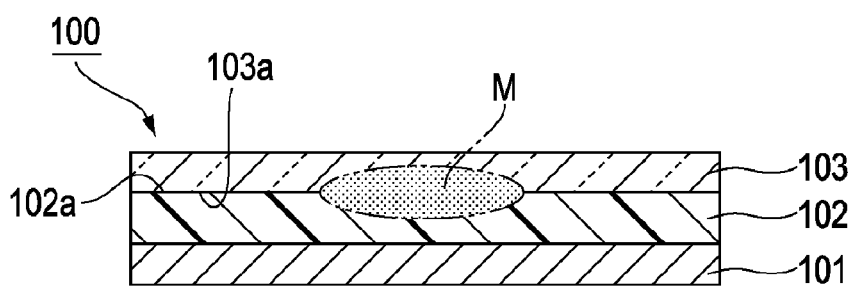

ELECTROPHORETIC DISPLAY

BACKGROUND

1. Technical Field

The present invention relates to electrophoretic displays, and particularly to improvements in electrophoretic displays for use as thin electronic paper in the field of display mounting.

2. Related Art

Featuring thinness, lightness, and low power consumption, flat displays such as liquid crystal display devices are widely used in various fields such as office automation equipment, information terminals, watches, and televisions. Liquid crystal display devices, such as cellular phones, are currently required to be thinner, lighter, and tougher.

Electrophoretic displays (EPDs), though inferior to liquid crystal display devices in terms of color display and video display, have attracted attention as thin, lightweight, low-power-consumption displays. EPDs, which have properties similar to those of paper, are under development as "electronic paper" to be read.

A microcapsule EPD, a typical example of electronic paper, includes microcapsules containing a solvent in which charged particles are dispersed and electrodes between which the microcapsules are held. An electric field generated by applying a voltage between the electrodes changes the distribution of the charged particles, thus providing a contrast. This display can advantageously maintain a displayed image without power consumption because the charged particles, attracted by electrostatic and intermolecular forces, remain near the electrodes after the voltage application is terminated. Another advantage is that the display is not angle-dependent, is eye-friendly like paper, and is easy to look at for a long time because the viewer views the colors of the charged particles and solvent themselves (i.e., reflected light) rather than transmitted light, as from liquid crystal displays, or self-emitted light, as from organic electroluminescent (EL) displays.

The features of an EPD, including thinness, lightness, and flexibility, result from the fact that most of the materials forming the display unit, called an electrophoretic sheet, are organic. This causes a problem, however, in that a further reduction in thickness and weight would impair the strength of the materials themselves, and the display would be vulnerable to an external impact and no longer durable for use as a commercial product.

An effective approach to solving the above problem is to apply an impact-damping material used for flat display devices, such as plasma displays, to an EPD to avoid damage to the display device. In fact, JP-A-2006-150755 has already proposed a structure including an impact layer and an impact-absorbing layer to damp an impact on a glass substrate included in an EPD.

A microcapsule EPD requires a thicker impact-damping layer because the microcapsules themselves have a lower impact resistance than the glass substrate. Although the use of a thicker impact-damping layer improves impact resistance, forming an impact-damping layer with a thickness of not less than 1 mm on a thin display like electronic paper would impair the original advantages of an EPD, such as thinness and lightness, thus seriously degrading its commercial value.

Another problem is that electronic paper, potentially used like paper, tends to suffer damage to the glass substrate by an impact resulting from its own weight upon falling. An effective approach to solving this problem is to reduce the total weight of the electronic paper by reducing the thickness of the glass substrate, a component of greatest specific gravity, and minimizing the thickness of the impact-damping layer on the display, thereby damping an impact upon falling. This approach, however, has a problem in that the thinner glass substrate has a lower strength and therefore a significantly lower resistance to bending stress and that the microcapsules would be damaged because the thinner impact-damping layer would not sufficiently absorb an impact.

As for the feature of viewability comparable to paper, an EPD is significantly advantageous for use under sunlight because of being a reflective display; the viewer views light reflected from the charged particles. A problem arises, however, in that the display would be degraded by temperature and humidity changes when used outdoors.

SUMMARY

An advantage of some aspects of the invention is that it provides a thin electrophoretic display with impact resistance and weather resistance.

An electrophoretic display according to an aspect of the invention includes an electrophoretic display module including an element substrate, a counter substrate disposed on a display side, and an electrophoretic layer held therebetween; a first protective sheet disposed on a counter substrate side of the electrophoretic display module; a second protective sheet disposed on an element substrate side of the electrophoretic display module so as to face the first protective sheet with the electrophoretic display module disposed therebetween; and a frame member disposed between the first and second protective sheets along the periphery thereof so as to surround the electrophoretic display module. The frame member is integrated with the first and second protective sheets by welding the frame member to the first protective sheet and to the second protective sheet.

In the above electrophoretic display, the electrophoretic display module is disposed between the first and second protective sheets, so that the overall electrophoretic display is not excessively thick. Thus, a thin electrophoretic display can be provided.

In addition, the frame member surrounds the electrophoretic display module and is integrated with the first and second protective sheets by welding. The electrophoretic display module is thus accommodated in a space formed by integrating the frame member with the first and second protective sheets. Hence the protective sheets are not delaminated from the frame member by, for example, an impact upon falling or a bending stress, so that no impact in any direction is directly exerted on the electrophoretic display module. This prevents the electrophoretic display module from being broken by an impact upon falling or bending stress that is likely to occur during use.

In addition, the first and second protective sheets and the frame member are welded together. Because there is no moisture-permeable component, such as an adhesive, between the first and second protective sheets and the frame member, the electrophoretic display module can be prevented from being degraded by humidity changes.

In the above electrophoretic display, a space filled with an air layer is preferably provided between the electrophoretic display module and the frame member, and the air layer preferably has a higher pressure than an ambient atmosphere.

If an air layer is provided between the electrophoretic display module and the frame member, it can further improve impact resistance.

In addition, if the air layer has a higher pressure than the ambient atmosphere, it can reduce the amount of moisture intruding from outside. This further improves the weather resistance of the electrophoretic display.

The above electrophoretic display may further include an impact-damping member between the electrophoretic display module and the frame member.

If the impact-damping member is disposed between the electrophoretic display module and the frame member, it can damp an impact on the periphery of the electrophoretic display module. This further improves the impact resistance of the electrophoretic display.

The above electrophoretic display preferably further includes an impact-damping layer between the first protective sheet and the electrophoretic display module.

If the impact-damping layer is disposed between the first protective sheet and the electrophoretic display module, it can damp an impact on the display side of the electrophoretic display module, that is, on the counter substrate side. This further improves the impact resistance of the electrophoretic display.

The above electrophoretic display preferably further includes a positioning member that positions the electrophoretic display module between the first and second protective sheets, and the positioning member is preferably integrated with the frame member.

If the electrophoretic display includes the positioning member, the electrophoretic display module can readily be positioned when accommodated between the first and second protective sheets. In addition, if the positioning member is integrated with the frame member, it can prevent the electrophoretic display module from being displaced between the first and second protective sheets and can damp an impact on the periphery of the electrophoretic display module. This further improves the impact resistance of the electrophoretic display.

The above electrophoretic display preferably further includes a connection substrate connected to the electrophoretic display module to electrically connect the electrophoretic display module to the outside of the frame member, and the connection substrate is preferably disposed so as to extend across the frame member from inside to outside.

If the connection substrate is connected to the electrophoretic display module to electrically connect it to the outside of the frame member and is disposed so as to extend across the frame member from inside to outside, the circuit substrate and the electrophoretic display module can reliably be connected together.

The frame member preferably has a through-portion extending therethrough from inside to outside, and the connection substrate is preferably disposed so as to extend across the frame member from inside to outside through the through-portion.

If the frame member has the through-portion extending therethrough from inside to outside and the connection substrate is disposed so as to extend across the frame member from inside to outside through the through-portion, the size of the connection substrate can be minimized. This contributes to a reduction in the overall display size, so that a more compact electrophoretic display can be provided.

The above electrophoretic display preferably further includes a thermosetting sealing member filling a gap between the connection substrate and the frame member in the through-portion.

If the electrophoretic display includes the thermosetting sealing member filling the gap between the connection substrate and the frame member in the through-portion, its moisture resistance can be improved.

The frame member preferably includes a first member welded to the first protective sheet and having a first groove constituting part of the though-portion and a second member welded to the second protective sheet, integrated with the first member, and having a second groove constituting the though-portion with the first groove.

If the frame member includes the first member welded to the first protective sheet and having the first groove constituting part of the though-portion and the second member welded to the second protective sheet, integrated with the first member, and having the second groove constituting the though-portion with the first groove, the ease of assembly of the overall display is improved.

The through-portion is preferably disposed at a position adjacent to at least one of the first and second protective sheets.

If the through-portion is disposed at a position adjacent to at least one of the first and second protective sheets, the ease of assembly of the overall display is improved. In particular, if the thermosetting sealing member is disposed in the through-portion, it can be cured by heat generated when the frame member is welded to the protective sheet adjacent to the through-portion.

The above electrophoretic display preferably further includes a circuit substrate disposed between the first and second protective sheets outside the frame member and having a drive circuit for the electrophoretic display module such that the drive circuit can communicate drive signals with the electrophoretic display module; and a second frame member disposed between the first and second protective sheets so as to surround the circuit substrate.

In this case, the circuit substrate, which has the drive circuit for the electrophoretic display module such that it can communicate drive signals with the electrophoretic display module, is disposed between the first and second protective sheets outside the frame member, and the second frame member is disposed between the first and second protective sheets so as to surround the circuit substrate. Even if the circuit substrate is disposed outside the frame member, a thin electrophoretic display with impact resistance can be provided.

The above electrophoretic display preferably further includes a connector connected to the outside of the display, and the circuit substrate is preferably electrically connected to the connector.

If the electrophoretic display further includes the connector connected to the outside of the display and the circuit substrate is electrically connected to the connector, the circuit substrate can readily be connected to the outside of the display.

The above electrophoretic display preferably further includes a circuit substrate disposed between the first and second protective sheets outside the frame member, having a drive circuit for the electrophoretic display module such that the drive circuit can communicate drive signals with the electrophoretic display module, and having a communication unit that communicates the drive signals with the electrophoretic display module without contact therebetween; and a second frame member disposed between the first and second protective sheets so as to surround the circuit substrate.

If the circuit substrate having the drive circuit for the electrophoretic display module is disposed outside the frame member and has the communication unit that communicates the drive signals with the electrophoretic display module without contact therebetween, the electrophoretic display module can be driven while being sealed only with the first and second protective sheets and the frame member. This further improves the moisture resistance.

The above electrophoretic display preferably further includes a power supply unit removably disposed on the circuit substrate.

If the electrophoretic display further includes the power supply unit removably disposed on the circuit substrate, it can be driven without using an external power supply. This improves the portability and usability of the electrophoretic display.

The power supply unit is preferably removably disposed on a side of the circuit substrate opposite the second protective sheet.

If the power supply unit is removably disposed on the side of the circuit substrate opposite the second protective sheet, the power supply unit can be disposed at a site where it does not affect displaying and can be removed.

The second protective sheet preferably has a lid at a position corresponding to the power supply unit in plan view.

If the second protective sheet has the lid at the position corresponding to the power supply unit in plan view, the power supply unit can be accessed from outside the electrophoretic display via the lid. This improves the ease of operation of the electrophoretic display and the ease of maintenance upon the replacement of the power supply unit.

The second protective sheet and the frame member are preferably configured as a single member.

If the second protective sheet and the frame member are configured as a single member, the moisture resistance can be further improved.

BRIEF DESCRIPTION OF THE DRAWINGS

The invention will be described with reference to the accompanying drawings, wherein like numbers reference like elements.

FIGS. 3A to 3D are schematic diagrams illustrating a process of welding materials together by heating using laser light.

DESCRIPTION OF EXEMPLARY EMBODIMENTS

Figure 1:
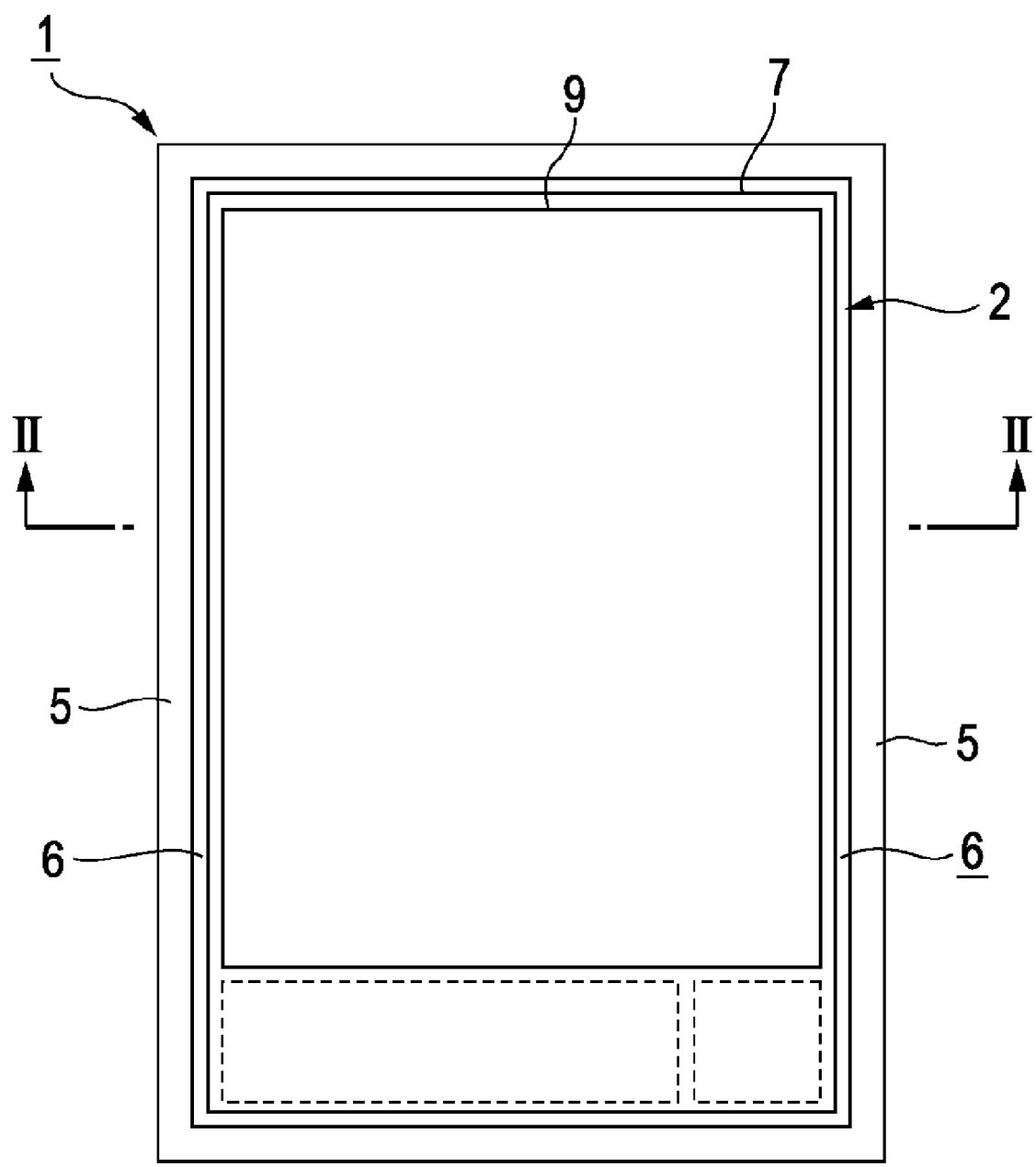
FIG. 1 is a plan view schematically showing an electrophoretic display according to a first embodiment of the invention.

Embodiments of the invention will now be described in detail with reference to the drawings. The following drawings are provided to illustrate the configurations of the embodiments of the invention, and the dimensional relationships, including size, thickness, and length, between the individual portions in the drawings may differ from those of actual electrophoretic displays.

First Embodiment

Figure 2:
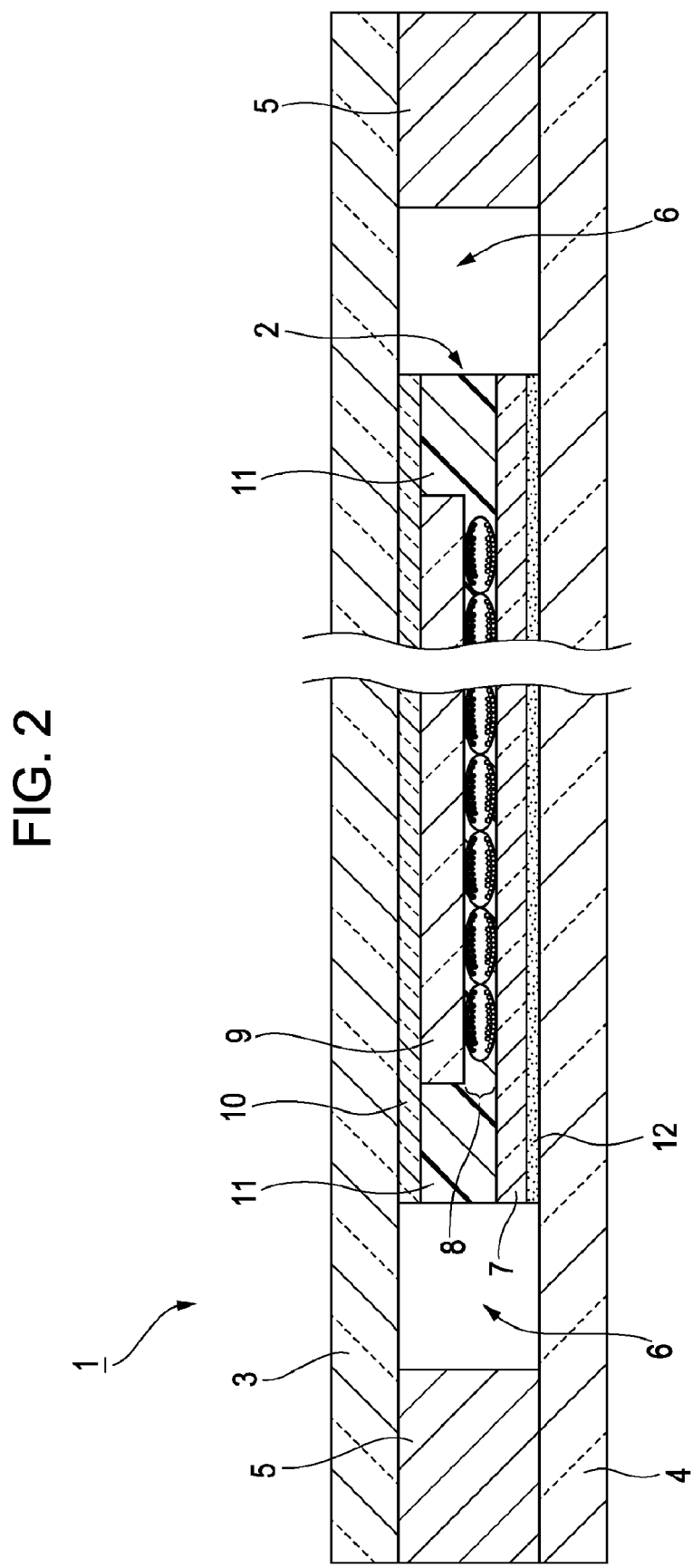
FIG. 2 is a schematic sectional view taken along line II-II of FIG. 1.

FIG. 1 is a plan view schematically showing an electrophoretic display according to a first embodiment of the invention. FIG. 2 is a schematic sectional view taken along line II-II of FIG. 1.

In FIGS. 1 and 2, an electrophoretic display 1 according to the first embodiment of the invention includes an electrophoretic display module 2, as described below, including a thin-film-transistor (TFT) glass substrate (element substrate) 7, a polyethylene terephthalate (PET) layer (counter substrate) 9, and an electrophoretic layer 8 held therebetween; a first protective sheet 3 disposed on the PET layer 9 side; a second protective sheet 4 disposed on the TFT glass substrate 7 side so as to face the first protective sheet 3; and a frame member 5 disposed between the first and second protective sheets 3 and 4 along the periphery thereof so as to surround the electrophoretic display module 2. In this embodiment, the first and second protective sheets 3 and 4 constitute the outermost layers of the electrophoretic display 1, and the first protective sheet 3 constitutes a display surface.

The electrophoretic display module 2, as shown in FIG. 2, includes the TFT glass substrate 7, on which pixel electrodes (not shown) are disposed; an electrophoretic sheet including, in order from the TFT glass substrate 7 side, the electrophoretic layer 8, a common electrode (not shown), and the PET layer 9; a moisture-proof layer 10 disposed on the electrophoretic sheet; and a moisture-proof resin 11 filling a space between the TFT glass substrate 7 and the moisture-proof layer 10.

In this embodiment, the TFT glass substrate 7 is formed of an alkali-free glass and has a thickness of about 0.5 mm. The element substrate 7 can instead be formed of a transparent resin such as PET. In this case, the element substrate 7 can be prepared by forming a thin-film circuit layer including thin-film circuit devices on a substrate such as a glass or quartz glass substrate, removing the thin-film circuit layer from the substrate, and transferring it to a plastic substrate. Alternatively, organic semiconductor devices may be directly formed on a resin substrate as the thin-film circuit devices by, for example, ink jetting.

The pixel electrodes can be formed on the element substrate 7 by, for example, patterning using known resist and etching processes, selective application of a material using a process such as droplet ejection, or vacuum deposition.

The electrophoretic sheet, for example, includes the PET layer 9 as a base on which the common electrode, the electrophoretic layer 8, and an adhesive layer are formed. The common electrode is formed of a transparent conductive material such as indium tin oxide (ITO).

In this embodiment, the electrophoretic layer 8 is a microcapsule electrophoretic layer including numerous microcapsules containing electrophoretic materials. The microcapsules can be prepared by, for example, dispersing positively charged black particles (electrophoretic material) and negatively charged white particles (electrophoretic material) in a dispersion medium and sealing the dispersion in tiny capsules.

This type of electrophoretic sheet is commercially available, and a commercial product may be used. In this embodiment, Vizplex (registered trademark), a product available from E.Ink Corporation, is used. In this embodiment, the electrophoretic sheet has a thickness of about 0.2 mm.

The moisture-proof layer 10 is formed of a transparent material resistant to permeation of moisture, such as water vapor or damp, that is, with low moisture permeability (e.g., low water vapor permeability). This avoids both an increase in the humidity of the electrophoretic sheet due to permeation of moisture from the first protective sheet 3 side into the electrophoretic sheet through the moisture-proof layer 10 and a decrease in the humidity of the electrophoretic sheet due to permeation of moisture from the electrophoretic sheet to the first protective sheet 3 side through the moisture-proof layer 10. In other words, the moisture-proof layer 10 maintains the electrophoretic sheet in a constant humidity environment.

Specifically, the moisture-proof layer 10 can be formed of a moisture-proof, transparent material such as fluororesin, polychlorotrifluoroethylene (PCTFE), or polytrifluoroethylene.

In this embodiment, the moisture-proof layer 10 is formed of Cellel (trade name), available from Kureha Corporation, and has a thickness of about 0.1 mm.

The moisture-proof resin 11, as shown in FIG. 2, fills the space between the TFT glass substrate 7 of the electrophoretic sheet and the moisture-proof layer 10. The moisture-proof resin 11 can reliably prevent moisture from intruding into the electrophoretic layer 8, which is susceptible to moisture. The moisture-proof resin 11 is formed of a resin such as epoxy resin, acrylic resin, or silicone resin. In this embodiment, Tuffy (trade name), available from Hitachi Chemical Co., Ltd., is used.

The first and second protective sheets 3 and 4, as shown in FIGS. 1 and 2, preferably have impact resistance and wear resistance. In addition, the first protective sheet 3 requires high transparency because it constitutes the display surface of the electrophoretic display 1, and preferably has weather resistance to avoid degradation of the electrophoretic layer 8. The first and second protective sheets 3 and 4 may be formed of a common plastic material such as acrylic resin, PET, or polycarbonate (PC). In this embodiment, the first and second protective sheets 3 and 4 are formed of Clarex (trade name), available from Nitto Jushi Kogyo Co., Ltd., and each have a thickness of about 0.5 mm.

The frame member 5, as shown in FIGS. 1 and 2, is disposed between the first and second protective sheets 3 and 4 along their periphery so as to surround the electrophoretic display module 2. The frame member 5 is integrated with the first and second protective sheets 3 and 4 by welding one surface of the frame member 5 to the first protective sheet 3 and welding the other surface of the frame member 5 to the second protective sheet 4. The electrophoretic display module 2 is thus accommodated in the sealed inner space of the composite formed by welding together the frame member 5 and the first and second protective sheets 3 and 4; thus, the electrophoretic display 1 has improved bending strength and breaking strength. In addition, moisture can be sufficiently prevented from intruding and diffusing into the electrophoretic display 1.

To accommodate the electrophoretic display module 2 in the sealed inner space of the above composite, as shown in FIG. 2, an adhesive layer 12 is provided between the TFT glass substrate 7 of the electrophoretic display module 2 and the second protective sheet 4. The adhesive layer 12 bonds the electrophoretic display module 2 and the second protective sheet 4 together, thus reliably fixing the electrophoretic display module 2 in the inner space.

The frame member 5 may be welded to the first and second protective sheets 3 and 4 by any method, such as heat welding (fusion) of materials by heating using laser light or welding by interdiffusion.

A method for heat welding (fusion) of materials by heating using laser light will now be described.

FIGS. 3A to 3D are schematic diagrams illustrating a process of welding materials together by heating using laser light. In this method of heat welding using laser light, first, as shown in FIG. 3A, a workpiece 100 including a metal substrate 101 and a light-absorbing resin layer 102 and a light-transmitting resin layer 103 stacked thereon is irradiated with laser light L from the side opposite the metal substrate 101, that is, from the light-transmitting resin layer 103 side. Referring to FIG. 3B, the laser light L, which is not absorbed by the light-transmitting resin layer 103, is absorbed into a surface 102a of the light-absorbing resin layer 102 forming the interface between the light-absorbing resin layer 102 and the light-transmitting resin layer 103. The laser light L heats and melts the vicinity of the surface 102a of the light-absorbing resin layer 102, thus forming a melted portion M.

Referring to FIG. 3C, as the irradiation with the laser light L is continued, a surface 103a of the light-transmitting resin layer 103 forming the interface between the light-absorbing resin layer 102 and the light-transmitting resin layer 103 is melted by the heat from the melted portion M to become part of the melted portion M. Referring to FIG. 3D, finally, the irradiation with the laser light L is terminated after the formation of the melted portion M proceeds sufficiently. The melted resin is then cured as the melted portion M is cooled. Although the melted portion M shows a boundary in FIG. 3D, there is in reality no boundary between the light-absorbing resin layer 102 and the light-transmitting resin layer 103. Thus, materials can be welded together by heating using laser light.

If heat welding (fusion) of materials by heating using laser light is employed, as described above, the frame member 5 is preferably formed of a material that absorbs the laser light. The material of the frame member 5 is preferably of the same type as that of the first and second protective sheets 3 and 4, although the material used is not particularly limited. For example, a material of different type from that of the first and second protective sheets 3 and 4 can be used by optimizing the laser welding conditions.

If the frame member 5 is formed of the same type of material (for example, acrylic resin) as the first protective sheet 3, which is highly transparent because it constitutes the display surface of the electrophoretic display 1, a layer capable of absorbing laser light can be formed by coloring the material or adding a pigment thereto. In this case, the color used is preferably one that favorably absorbs laser light, for example, a deep color such as black, navy, blue, or red.

If, for example, welding by interdiffusion, such as ultrasonic welding, is employed, the frame member 5 does not have to be formed of a material that absorbs laser light; it may be formed of a material whose glass transition point is close to that of the material of the first and second protective sheets 3 and 4. In addition, the material of the frame member 5 is preferably of the same type as that of the first and second protective sheets 3 and 4.

In this embodiment, the frame member 5 is formed of Sumipex (trade name), available from Sumitomo Chemical Co., Ltd., and has a thickness of about 2 mm. In addition, the frame member 5 is welded to the first and second protective sheets 3 and 4 using the laser source RI-7000 (device name), available from Ricoh Optical Industries Co., Ltd.

The electrophoretic display 1 according to this embodiment, as shown in FIGS. 1 and 2, has a space 6 between the electrophoretic display module 2 and the frame member 5. An air layer (air gap) in the space 6 can further improve the impact resistance of the electrophoretic display 1. In addition, the air layer has a higher pressure than the ambient atmosphere so that it can reduce the amount of moisture intruding from outside into the electrophoretic display 1 and the amount of moisture diffusing from inside to outside. This further improves weather resistance. To form the air layer having a higher pressure than the ambient atmosphere, the electrophoretic display module 2 may be sealed under a positive pressure in the inner space of the composite formed by welding together the frame member 5 and the first and second protective sheets 3 and 4.

Instead of the air layer, the space 6 may be filled with, for example, an impact-damping material such as a porous resin or an elastomer. This further improves the impact resistance of the electrophoretic display 1.

In the electrophoretic display 1 thus configured, an electric field applied between the pixel electrodes and the common electrode exerts an electrostatic force on the positively charged particles (black) and the negatively charged particles (white) sealed in the microcapsules in the electrophoretic layer 8 in the directions corresponding to their polarities. In FIG. 2, for example, the positively charged particles (black) above the pixel electrodes at a higher potential than the common electrode move to the common electrode (lower potential) side. These particles are visible from the first protective sheet 3 (outermost layer) side through the common electrode, which is transparent, so that the pixels corresponding to those pixel electrodes are displayed in black. In addition, the potential difference between the pixel electrodes and the common electrode can be controlled for each pixel, thereby displaying a desired image.

A typical electrophoretic display requires more strict humidity control than other types of displays such as liquid crystal displays because an electrophoretic layer is degraded either above or below a certain humidity. For known electrophoretic displays, nevertheless, satisfactory humidity control is difficult because materials with low moisture permeability are vulnerable to impacts.

With the advantages of the embodiment described above, in contrast, the moisture-proof layer 10 can be successfully prevented from being damaged. The electrophoretic display 1 according to this embodiment, including the moisture-proof layer 10, can sufficiently prevent degradation of the electrophoretic layer 8, thus achieving an extended life.

If the first protective sheet 3, one of the outermost layers, is formed of acrylic resin as in this embodiment, it can be made scratch-proof, lightweight, and weather-resistant, as described above. The weather resistance refers to the property of a material being resistant to degradation due to, for example, ultraviolet rays and heat from sunlight, rain water, and temperature changes, and is evaluated by, for example, an outdoor exposure test. Having superior weather resistance, the electrophoretic display 1 can be used under a wide variety of environmental conditions; therefore, it has better portability and, for example, can be used outdoors.

Although the electrophoretic layer 8 used in this embodiment is a microcapsule electrophoretic layer, it may be another type of electrophoretic layer. For example, the electrophoretic layer 8 may be provided by forming a partition between the pixel electrodes, providing a dispersion of electrophoretic materials on the pixel electrodes, and sealing it with the common electrode.

Although the first protective sheet 3 serves as one of the outermost layers of the display unit, as shown in FIG. 2, in this embodiment, a functional film such as an ultraviolet protective film, an antireflection film, or a scratch-proof hard coat may be provided on the first protective sheet 3 as the outermost layer.

In addition, the components such as the moisture-proof layer 10, the first protective sheet 3, and the second protective sheet 4 do not each have to be composed of a single layer and may also be composed of a plurality of layers.

In the electrophoretic display 1 according to this embodiment, as described above, the electrophoretic display module 2 is disposed between the first and second protective sheets 3 and 4, so that the total thickness of the electrophoretic display 1 does not exceed 5 mm. Thus, a thin electrophoretic display 1 can be provided.

In addition, the frame member 5 surrounds the electrophoretic display module 2 and is integrated with the first and second protective sheets 3 and 4. The electrophoretic display module 2 is thus accommodated in the space formed by the first and second protective sheets 3 and 4 and the frame member 5, so that no impact in any direction is directly exerted on the electrophoretic display module 2. This prevents the electrophoretic display module 2 from being broken by an impact upon falling or bending stress that is likely to occur during use.

In addition, the first and second protective sheets 3 and 4 and the frame member 5 are welded together. Because there is no moisture-permeable component, such as an adhesive, between the first and second protective sheets 3 and 4 and the frame member 5, the electrophoretic display module 2 can be prevented from being degraded by humidity changes.

In addition, the electrophoretic display 1 according to this embodiment has the space 6 between the electrophoretic display module 2 and the frame member 5. The air layer in the space 6 can further improve the impact resistance. In addition, the air layer has a higher pressure than the ambient atmosphere so that it can reduce the amount of moisture intruding from outside and the amount of moisture diffusing into the outside. This further improves the moisture resistance (weather resistance) of the electrophoretic display 1.

Second Embodiment

Figure 4:
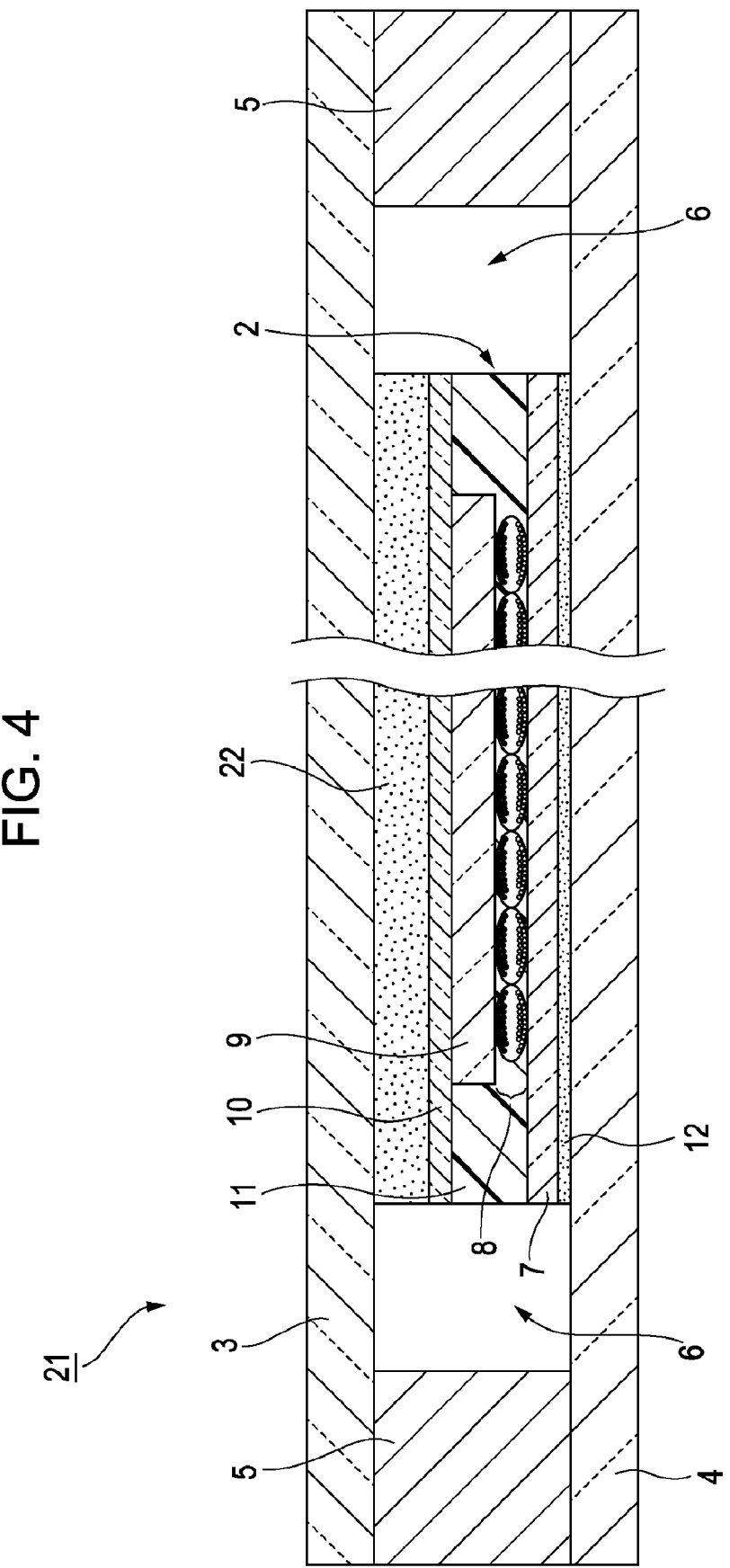
FIG. 4 is a schematic sectional view showing an electrophoretic display according to a second embodiment of the invention.

FIG. 4 is a schematic sectional view showing an electrophoretic display according to a second embodiment of the invention. Of the components shown in FIG. 4, the same components as shown in FIGS. 1 and 2 are indicated by the same reference numerals and will not be described or will only be briefly described.

In FIG. 4, an electrophoretic display 21 according to the second embodiment of the invention includes an impact-damping layer 22 between the moisture-proof layer 10 of the electrophoretic display module 2 and the first protective sheet 3.

The impact-damping layer 22, like known impact-damping layers, is a transparent layer formed of a flexible material such as an elastomer. When an impact is applied to the first protective sheet 3, the impact-damping layer 22 is deformed to absorb or damp the impact. The impact-damping layer 22 does not have to be composed of a single layer and may also be composed of a plurality of layers.

In this embodiment, the impact-damping layer 22 is formed of Elastomer (trade name), available from Hitachi Chemical Co., Ltd., and has a thickness of about 0.2 mm.

The electrophoretic display 21 according to this embodiment, as described above, provides the same advantages as the electrophoretic display 1 according to the first embodiment.

In the electrophoretic display 21 according to this embodiment, additionally, the impact-damping layer 22 is disposed between the first protective sheet 3 and the electrophoretic display module 2 so that it can damp an impact on the display side of the electrophoretic display module 2, that is, on the PET layer (counter substrate) 9 side. This prevents damage to the electrophoretic layer 8 and the moisture-proof layer 10, thus further improving the impact resistance of the electrophoretic display 21.

Third Embodiment

Figure 5A:
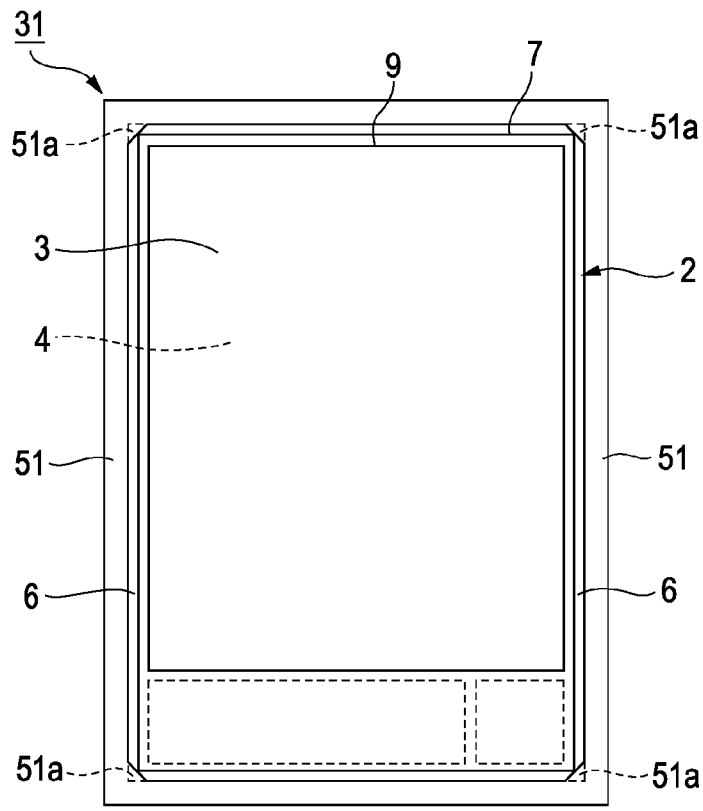
FIGS. 5A and 5B are plan views schematically showing electrophoretic displays according to a third embodiment of the invention.
Figure 5B:
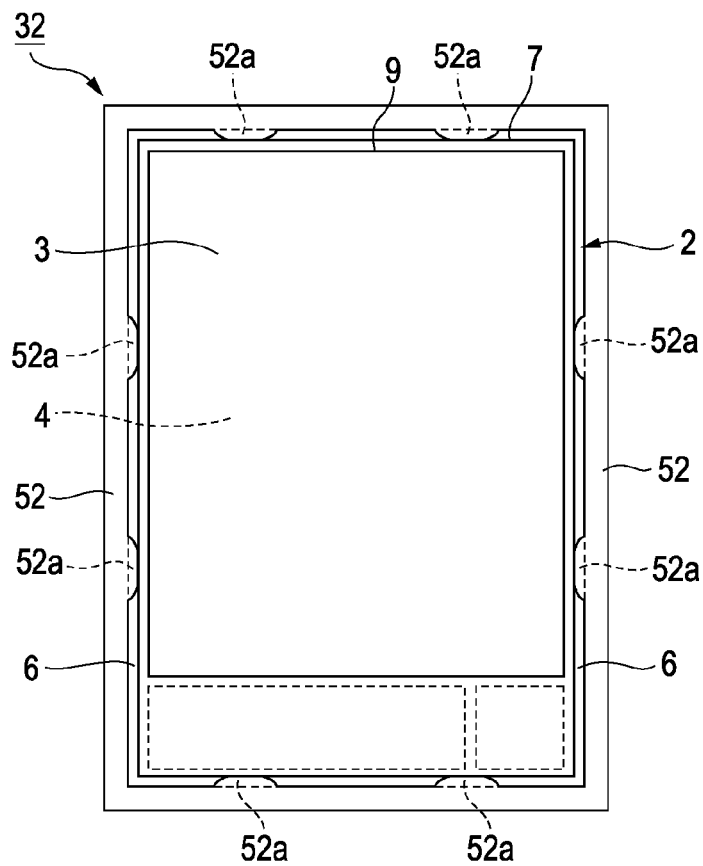

FIGS. 5A and 5B are plan views schematically showing electrophoretic displays according to a third embodiment of the invention. Of the components shown in FIGS. 5A and 5B, the same components as shown in FIGS. 1, 2, and 4 are indicated by the same reference numerals and will not be described or will only be briefly described.

In FIGS. 5A and 5B, electrophoretic displays 31 and 32 according to the third embodiment of the invention include positioning members 51a and 52a, respectively, that position the electrophoretic display module 2 between the first and second protective sheets 3 and 4. The positioning members 51a and 52a are integrated with frame members 51 and 52, respectively.

The positioning members 51a, as shown in FIG. 5A, have a triangular shape and are integrated with the frame member 51 at positions opposite the four corners of the rectangular electrophoretic display module 2. When accommodated in the space formed by the first and second protective sheets 3 and 4 and the frame member 5, the electrophoretic display module 2 can readily be positioned by allowing its four corners to face the positioning members 51a. In addition, because the positioning members 51a are disposed opposite the four corners of the electrophoretic display module 2, which are readily damaged, and are integrated with the frame member 51, the positioning members 51a can prevent the electrophoretic display module 2 from being displaced by, for example, an impact upon falling, thus sufficiently preventing damage to the electrophoretic display module 2.

The positioning members 52a, as shown in FIG. 5B, have a semicircular shape and are integrated with the frame member 52 at positions opposite the four sides of the rectangular electrophoretic display module 2 (two for each side). When accommodated in the space formed by the first and second protective sheets 3 and 4 and the frame member 52, the electrophoretic display module 2 can readily be positioned by allowing its four sides to face the positioning members 52a. In addition, because the positioning members 52a are integrated with the frame member 52, they can sufficiently prevent damage to the electrophoretic display module 2.

The electrophoretic displays 31 and 32 according to this embodiment, as described above, include the positioning members 51a and 52a that position the electrophoretic display module 2 between the first and second protective sheets 3 and 4 so that the electrophoretic display module 2 can readily be positioned when accommodated in the space formed by the first and second protective sheets 3 and 4 and the frame members 51 and 52. In addition, because the positioning members 51a and 52a are integrated with the frame members 51 and 52, they can damp an impact on the periphery (four corners and four sides) of the electrophoretic display module 2. This further improves the impact resistance of the electrophoretic displays 31 and 32.

Figure 6A:
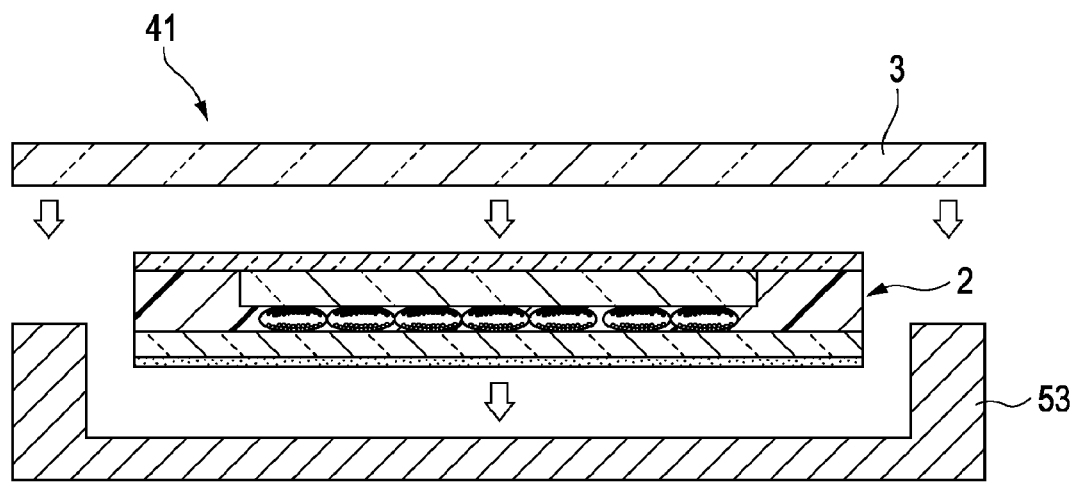
FIGS. 6A and 6B are schematic sectional views showing electrophoretic displays according to modifications of the invention.

The technical scope of the invention is not limited to the above embodiments; various modifications are permitted without departing from the spirit of the invention. For example, if no transparent resin is needed for the components other than the first protective sheet, which constitutes the display surface of the electrophoretic display, that is, if the backside does not have to be transparent, as in the case of an electrophoretic display 41 shown in FIG. 6A, the second protective sheet and the frame member may be integrated into a box-shaped light-absorbing member 53. Molding the light-absorbing member 53 in one piece reduces the production costs of the electrophoretic display 41.

Figure 6B:
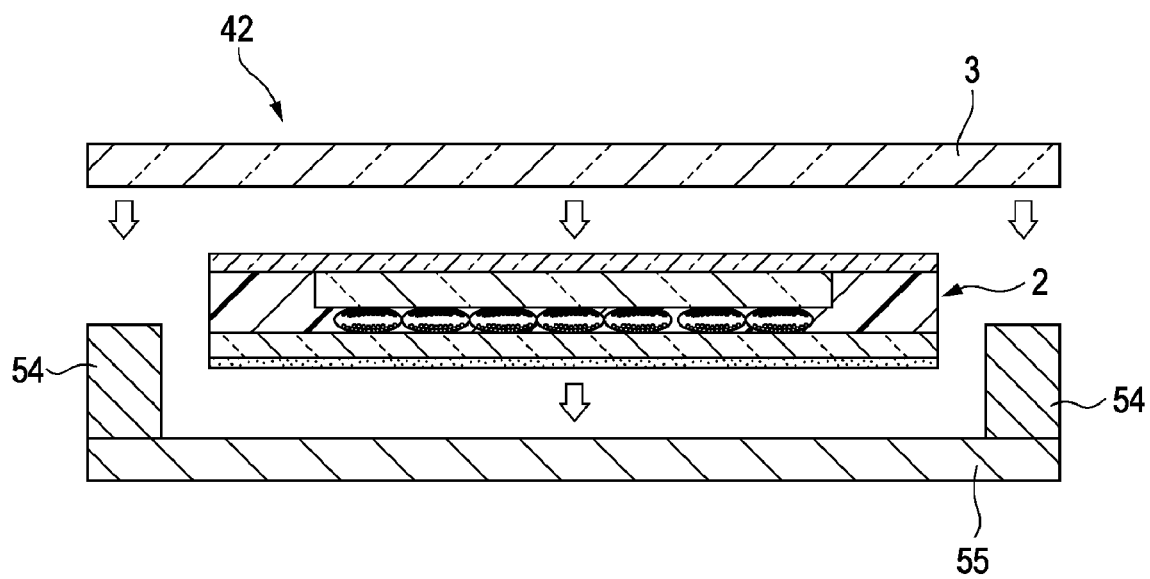

If no flexibility is needed, as in the case of an electrophoretic display 42 shown in FIG. 6B, the second protective sheet can be replaced with a metal substrate 55 such as a stainless steel sheet. In this case, a frame member 54 can be integrated with the periphery of the metal substrate 55 by insert molding, the electrophoretic display module 2 being bonded to the surface of the metal substrate 55. This significantly improves the impact resistance of the electrophoretic display 42.

Fourth Embodiment

Figure 7A:
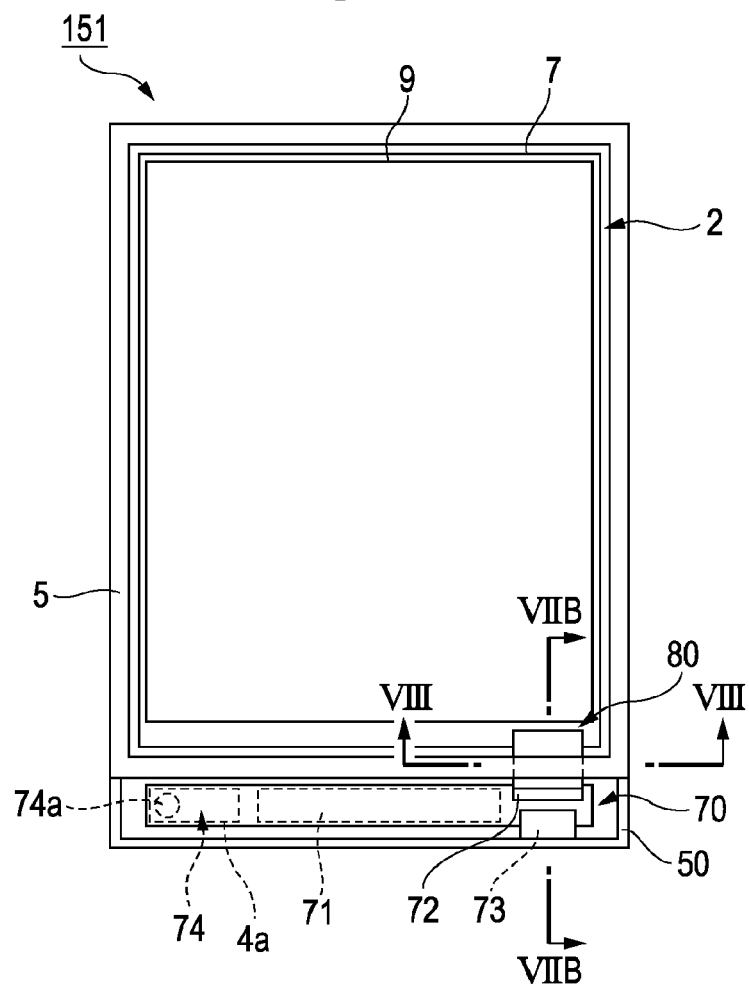
FIG. 7A is a plan view showing an electrophoretic display according to a fourth embodiment of the invention.
Figure 7B:
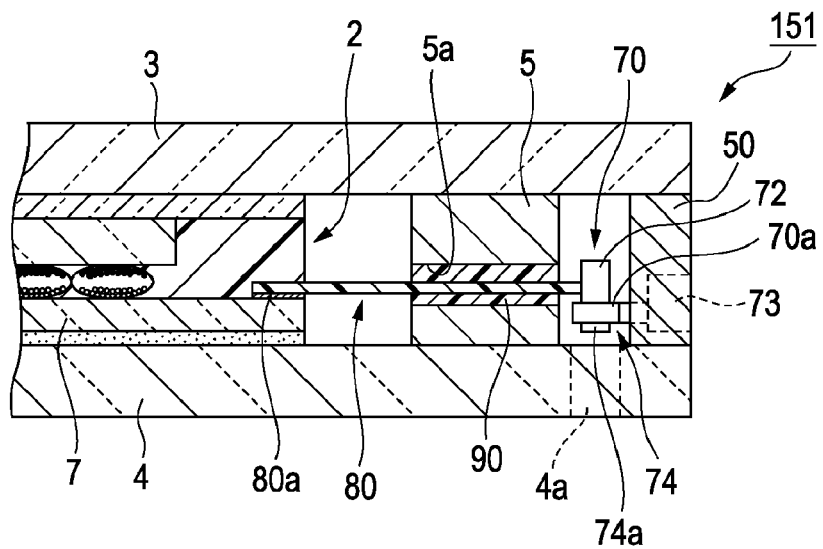
FIG. 7B is a sectional view taken along line VIIB-VIIB of FIG. 7A.

FIGS. 7A and 7B are diagrams showing the structure of an electrophoretic display 151 according to a fourth embodiment of the invention: FIG. 7A is a plan view of the electrophoretic display 151, and FIG. 7B is a sectional view taken along line VIIB-VIIB of FIG. 7A. Of the components shown in FIGS. 7A and 7B, the same components as shown in FIGS. 1, 2, and 4 are indicated by the same reference numerals and will not be described or will only be briefly described.

In the electrophoretic display 151 according to this embodiment, a drive circuit for driving the electrophoretic display module 2 is disposed on a substrate different from the element substrate 7 of the electrophoretic display module 2, namely, a circuit substrate 70, and the element substrate 7 and the circuit substrate 70 are connected together with a connection substrate 80. Of the electrophoretic display module 2 and the circuit substrate 70, the frame member 5 surrounds only the electrophoretic display module 2 in this embodiment.

The element substrate 7 has connection terminals (not shown) at the right end of the bottom side in the plan view of FIG. 7A. These connection terminals connect the electrophoretic display module 2 to the connection substrate 80. The connection terminals are connected to, for example, a semiconductor device on the element substrate 7. The element substrate 7 is connected to the connection substrate 80 in a region where the connection terminals are disposed.

The circuit substrate 70 is disposed between the first and second protective sheets 3 and 4 outside the frame member 5 in plan view (on the bottom in FIG. 7A). The circuit substrate 70 includes a substrate body 70a, a drive circuit 71, a module connector 72, an external connector 73, and a power supply unit 74. The module connector 72 electrically connects the connection substrate 80 to the drive circuit 71. The external connector 73 is connected to, for example, an external power supply.

The power supply unit 74 is disposed on the side of the substrate body 70a opposite the second protective sheet 4 and includes a removable power supply 74a such as a battery. The power supply 74a can be used as an internal power supply for the electrophoretic display 151. With the external connector 73 and the power supply unit 74, the electrophoretic display 151 according to this embodiment can operate either in a power mode in which the electrophoretic display 151 is connected to an external power supply via the external connector 73 or in a power mode in which the electrophoretic display 151 is powered by the power supply 74a of the power supply unit 74.

The second protective sheet 4 has, for example, a lid 4a at a position where it overlaps the power supply unit 74 in plan view. The lid 4a can be opened and closed relative to the rest of the second protective sheet 4. With the lid 4a open, the power supply 74a behind the lid 4a can be externally accessed.

The circuit substrate 70 is surrounded by a second frame member 50. The second frame member 50 is disposed between the first and second protective sheets 3 and 4 outside the frame member 5. The second frame member 50 extends along the three sides of the circuit substrate 70 other than the side opposite the electrophoretic display module 2 in plan view (the left, bottom, and right sides in FIG. 7A), thus covering these three sides of the circuit substrate 70. The frame member 5, on the other hand, covers the side of the circuit substrate 70 opposite the electrophoretic display module 2 (the top side in FIG. 7A). The second frame member 50 can be formed of, for example, the same material as the frame member 5. The external connector 73 has a connection terminal exposed outside the second frame member 50.

One end of the connection substrate 80 is connected to the element substrate 7 via, for example, an anisotropic conductive adhesive 80a containing conductive particles. The other end of the connection substrate 80 is connected to the circuit substrate 70 via the module connector 72. The frame member 5 has a through-hole 5a through which the connection substrate 80 extends. The connection substrate 80 is disposed so as to extend across the frame member 5 from inside to outside through the through-hole 5a. Thus the connection substrate 80 is disposed so as to extend across the frame member 5 from inside to outside.

The through-hole 5a is larger than the connection substrate 80 in cross section, so that a gap is formed between the connection substrate 80 and the frame member 5. A sealing member 90 is disposed in the through-hole 5a so as to fill the gap. The sealing member 90 is formed of a material such as a thermosetting resin. With the sealing member 90, moisture can more reliably be prevented from intruding into the electrophoretic display module 2.

As in the above embodiments, the electrophoretic display 151 according to this embodiment is constituted by welding together the frame member 5 and the first and second protective sheets 3 and 4. The use of a thermosetting resin for the sealing member 90 results in a more efficient production process because it can be cured with the heat generated during the welding.

Figure 8:
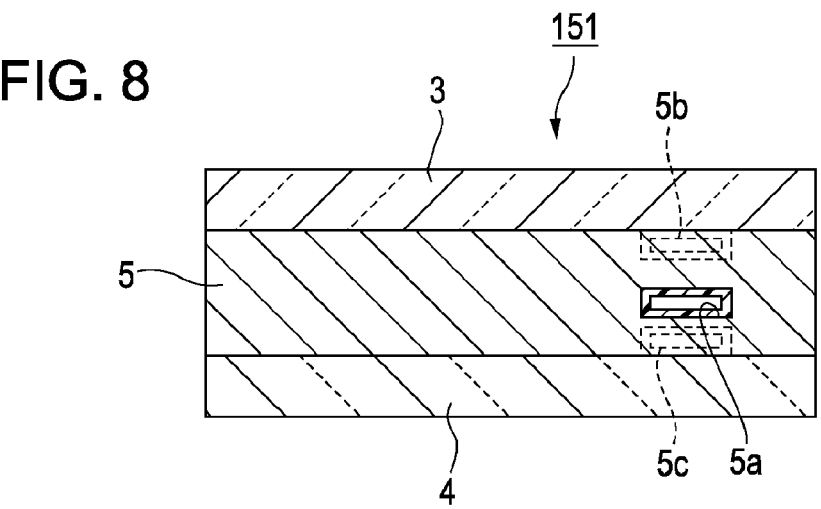
FIG. 8 is a sectional view taken along line VIII-VIII of FIG. 7A.

FIG. 8 is a sectional view taken along line VIII-VIII of FIG. 7A. In FIG. 8, the connection substrate 80 is omitted for visibility.

In FIG. 8, the through-hole 5a is formed in substantially the center of the electrophoretic display 151 in the thickness direction (in the vertical direction in FIG. 8). The through-hole 5a may also be formed at, for example, a position 5b adjacent to the first protective sheet 3 or a position 5c adjacent to the second protective sheet 4. This allows for more efficient use of the heat generated during the welding.

According to this embodiment, the circuit substrate 70, which has the drive circuit 71 for the electrophoretic display module 2 such that it can communicate drive signals with the electrophoretic display module 2, is disposed between the first and second protective sheets 3 and 4 outside the frame member 5, and the second frame member 50 is disposed between the first and second protective sheets 3 and 4 so as to surround the circuit substrate 70. Even if the circuit substrate 70 is disposed outside the frame member 5, a thin electrophoretic display 151 with impact resistance can be provided.

Fifth Embodiment

Next, a fifth embodiment of the invention will be described.

Figure 9A:
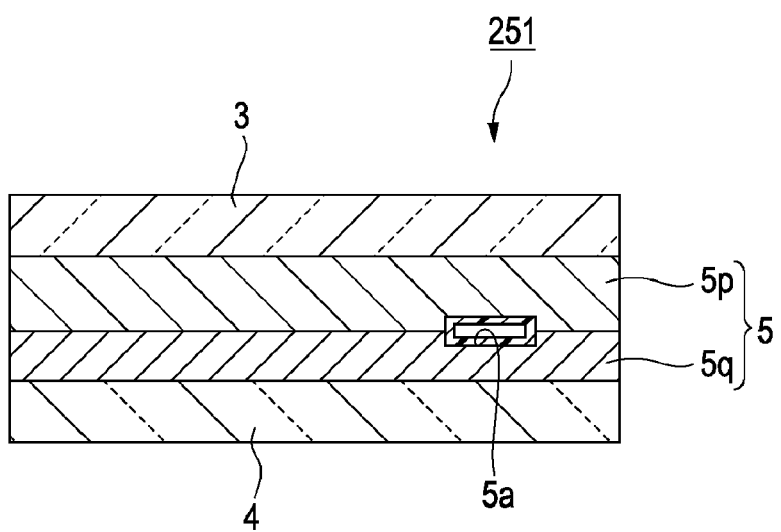
FIGS. 9A and 9B are sectional views showing an electrophoretic display according to the fourth embodiment of the invention.
Figure 9B:
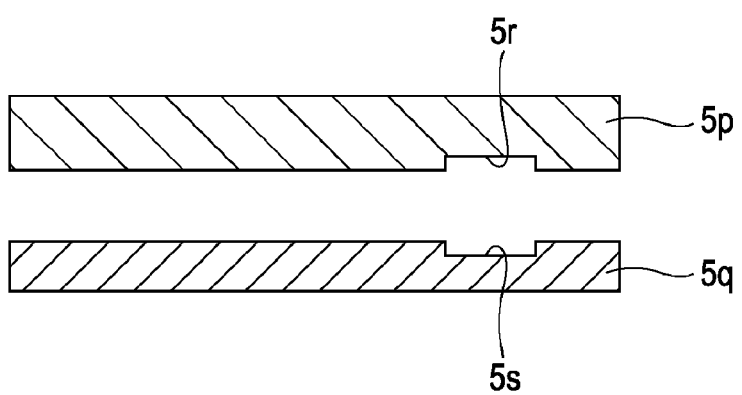

FIGS. 9A and 9B are schematic sectional views showing the structure of an electrophoretic display 251 according to this embodiment. FIG. 9A is a diagram of the electrophoretic display 251 as viewed from the same perspective as FIG. 8 in the fourth embodiment. FIG. 9B is an exploded view of part of the electrophoretic display 251. In FIGS. 9A and 9B, the top side is the display side, and the bottom side is the backside. In FIG. 9, as in FIG. 8 above, the connection substrate 80 is omitted for visibility.

As shown in FIGS. 9A and 9B, this embodiment differs from the fourth embodiment in that the frame member 5 includes different members on the display side and the backside and they are integrated. As for the other structure, this embodiment is the same as the fourth embodiment. The frame member 5 includes a first member 5p on the display side and a second member 5q on the backside.

The integrated first and second members 5p and 5q are opposing frame-shaped components constituting the frame member 5 surrounding the electrophoretic display module 2. The first and second members 5p and 5q have the same shape in plan view, and their sides are flush with each other when disposed opposite each other. The surfaces of the first and second members 5p and 5q facing away from each other are welded to the first and second protective sheets 3 and 4, respectively. The first and second members 5p and 5q may be coupled together by welding or by bonding using, for example, an adhesive.

First and second grooves 5r and 5s are formed in the opposing surfaces of the first and second members 5p and 5q, respectively. The first and second grooves 5r and 5s extend from inside to outside across the frame shape of the first and second members 5p and 5q. The first and second grooves 5r and 5s are formed at positions where they overlap each other in plan view and constitute the through-hole 5a when the first and second members 5p and 5q are disposed opposite each other.

According to this embodiment, as described above, the frame member 5 includes the first member 5p, which is welded to the first protective sheet 3 and which has the first groove 5r constituting part of the though-hole 5a, and the second member 5q, which is welded to the second protective sheet 4, which is integrated with the first member 5p, and which has the second groove 5s constituting the though-hole 5a with the first groove 5r. This improves the ease of assembly of the overall electrophoretic display 251.

The technical scope of the invention is not limited to the above embodiments; various modifications are permitted without departing from the spirit of the invention.

Figure 10:
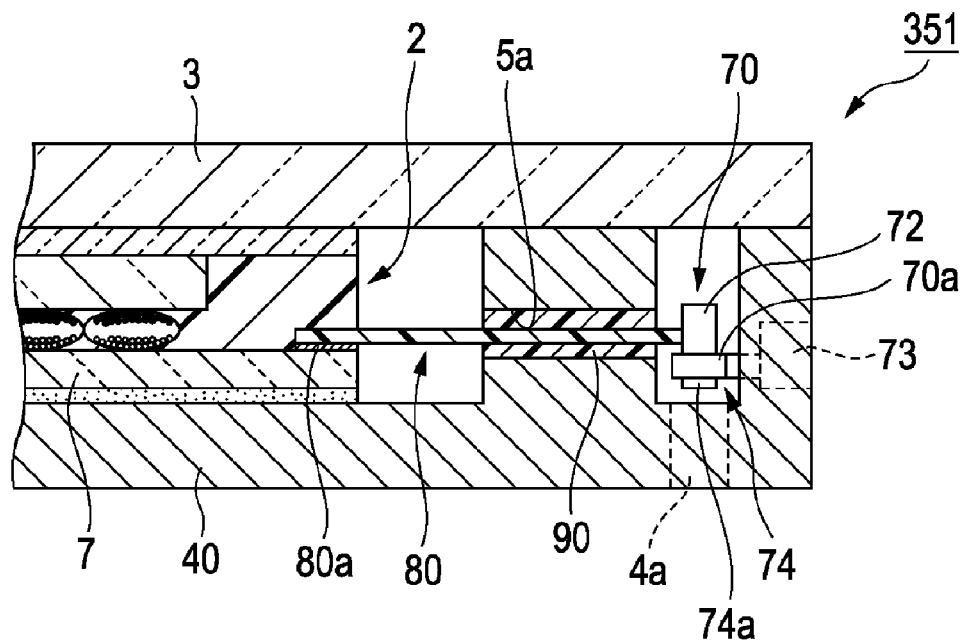
FIG. 10 is a schematic sectional view showing an electrophoretic display according to a modification of the invention.

For example, although the second protective sheet 4 and the frame member 5 are separate members in the above embodiments, the invention is not limited thereto. As shown in FIG. 10, for example, the second protective sheet 4 and the frame member 5 may be configured as a single member 40. In this case, for example, the single member 40 may be formed by welding together the second protective sheet 4 and the frame member 5 in advance before the production of the electrophoretic display and may be welded to the first protective sheet 3 during the production of the electrophoretic display. This improves the assembly efficiency of the electrophoretic display and further improves its moisture resistance. If the second protective sheet 4 and the frame member 5 are configured as the single member 40, they may be formed of the same material or different materials.

Figure 11:
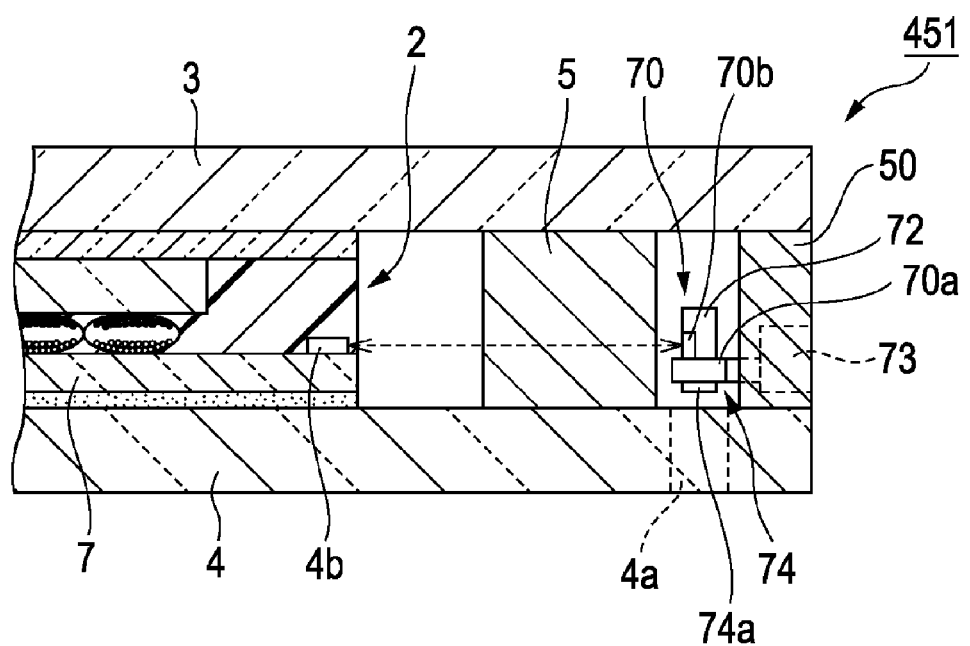
FIG. 11 is a schematic sectional view showing an electrophoretic display according to a modification of the invention.

In addition, although the electrophoretic display module 2 and the circuit substrate 70 are connected together with the connection substrate 80 in the fourth and fifth embodiments, the invention is not limited thereto. As shown in FIG. 11, for example, the electrophoretic display module 2 and the circuit substrate 70 may be configured so as to communicate drive signals without contact therebetween, such as by wireless communication. An electrophoretic display 451 shown in FIG. 11 includes a communication unit 4b on the electrophoretic display module 2 and a communication unit 70b on the circuit substrate 70. The communication units 4b and 70b used may be, for example, optical communication units. This allows the electrophoretic display module 2 to be reliably sealed without the need for the though-hole 5a and the sealing member 90.

The structures of the electrophoretic displays according to the above embodiments can be used not only as an electronic paper structure but also as a structure for improving the impact resistance and weather resistance (moisture resistance) of a display including a glass substrate, such as a liquid crystal panel or an organic EL display.

The entire disclosure of Japanese Patent Application Nos: 2008-073582, filed Mar. 21, 2008 and 2008-271839, filed Oct. 22, 2008 are expressly incorporated by reference herein.

What is claimed is:

1. An electrophoretic display comprising:
an electrophoretic display module including an element substrate, a counter substrate disposed on a display side of the element substrate, and an electrophoretic layer held therebetween;
a first protective sheet disposed on a counter substrate side of the electrophoretic display module;
a second protective sheet disposed on an element substrate side of the electrophoretic display module so as to face the first protective sheet with the electrophoretic display module disposed therebetween; and
a frame member disposed between the first and second protective sheets along the periphery thereof so as to surround the electrophoretic display module, the frame member being integrated with the first and second protective sheets by welding the frame member to the first protective sheet and to the second protective sheet.

2. The electrophoretic display according to claim 1, wherein a space filled with an air layer is provided between the electrophoretic display module and the frame member.

3. The electrophoretic display according to claim 2, wherein the air layer has a higher pressure than an ambient atmosphere.

4. The electrophoretic display according to claim 1, further comprising an impact-damping member between the electrophoretic display module and the frame member.

5. The electrophoretic display according to claim 1, further comprising an impact-damping layer between the first protective sheet and the electrophoretic display module.

6. The electrophoretic display according to claim 1, further comprising a positioning member that positions the electrophoretic display module between the first and second protective sheets, the positioning member being integrated with the frame member.

7. The electrophoretic display according to claim 1, further comprising a connection substrate connected to the electrophoretic display module to electrically connect the electrophoretic display module to the outside of the frame member, the connection substrate being disposed so as to extend across the frame member from inside to outside.

8. The electrophoretic display according to claim 7, wherein the frame member has a through-portion extending therethrough from inside to outside, the connection substrate being disposed so as to extend across the frame member from inside to outside through the through-portion.

9. The electrophoretic display according to claim 8, further comprising a thermosetting sealing member filling a gap between the connection substrate and the frame member in the through-portion.

10. The electrophoretic display according to claim 8, wherein the frame member includes:
a first member welded to the first protective sheet and having a first groove constituting part of the though-portion; and
a second member welded to the second protective sheet, integrated with the first member, and having a second groove constituting the though-portion with the first groove.

11. The electrophoretic display according to claim 8, wherein the through-portion is disposed at a position adjacent to at least one of the first and second protective sheets.

12. The electrophoretic display according to claim 7, further comprising:
a circuit substrate disposed between the first and second protective sheets outside the frame member, electrically connected to the electrophoretic display module via the connection substrate, and having a drive circuit for the electrophoretic display module; and
a second frame member disposed between the first and second protective sheets so as to surround the circuit substrate.

13. The electrophoretic display according to claim 12, further comprising a connector connected to the outside of the display, the circuit substrate being electrically connected to the connector.

14. The electrophoretic display according to claim 1, further comprising:
a circuit substrate disposed between the first and second protective sheets outside the frame member, having a drive circuit for the electrophoretic display module such that the drive circuit can communicate drive signals with the electrophoretic display module, and having a communication unit that communicates the drive signals with the electrophoretic display module without contact therebetween; and
a second frame member disposed between the first and second protective sheets so as to surround the circuit substrate.

15. The electrophoretic display according to claim 7, further comprising a power supply unit removably disposed on the circuit substrate.

16. The electrophoretic display according to claim 15, wherein the power supply unit is removably disposed on a side of the circuit substrate opposite the second protective sheet.

17. The electrophoretic display according to claim 16, wherein the second protective sheet has a lid at a position corresponding to the power supply unit in plan view.

18. The electrophoretic display according to claim 7, wherein the second protective sheet and the frame member are configured as a single member.

* * * * *